(12) United States Patent
Nam

(10) Patent No.: US 7,400,750 B2
(45) Date of Patent: Jul. 15, 2008

(54) FINGERPRINT SENSOR AND FABRICATION METHOD THEREOF

(75) Inventor: Yun-woo Nam, Gyeonggi-do (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 876 days.

(21) Appl. No.: 10/928,133

(22) Filed: Aug. 30, 2004

(65) Prior Publication Data

US 2005/0105784 A1    May 19, 2005

(30) Foreign Application Priority Data

Nov. 18, 2003    (KR) .................. 10-2003-0081724

(51) Int. Cl.
  *G06K 9/00* (2006.01)
(52) U.S. Cl. ........................ 382/124; 73/620
(58) Field of Classification Search ................ 382/124, 382/126, 127; 73/602, 603, 620, 629, 632; 367/140, 178, 180
See application file for complete search history.

(56) References Cited

U.S. PATENT DOCUMENTS

| | | | |
|---|---|---|---|
| 4,977,601 A * | 12/1990 | Bicz | 382/124 |
| 5,224,174 A * | 6/1993 | Schneider et al. | 382/124 |
| 5,587,533 A | 12/1996 | Schneider et al. | |
| 7,236,616 B1 * | 6/2007 | Scott | 382/124 |

FOREIGN PATENT DOCUMENTS

| | | |
|---|---|---|
| EP | 0 649 116 A1 | 4/1995 |
| WO | WO 01/71648 A2 | 9/2001 |
| WO | WO 01/71648 A3 | 9/2001 |
| WO | WO 02/37402 A1 | 5/2002 |

OTHER PUBLICATIONS

B. Charlot et al., "A Sweeping Mode Integrated Tactile Fingerprint Sensor", Proceedings of the 12th International Conference on Solidstate Sensors, Actuators, and Microsystems, Boston, Jun. 8-12, 2003, vol. 2, pp. 1031-1034.
European Patent Office Search Report.

* cited by examiner

*Primary Examiner*—Phuoc Tran
(74) *Attorney, Agent, or Firm*—Buchanan Ingersoll & Rooney PC

(57) ABSTRACT

Provided are a fingerprint sensor and a fabrication method thereof. The fingerprint sensor includes: a complementary metal-oxide semiconductor structure which is formed on a substrate that is doped with a first type dopant; an insulating layer which is formed on the complementary metal-oxide semiconductor structure; a lower electrode which is formed in a central portion of the insulating layer; a piezoelectric region which is formed on the lower electrode; an upper electrode which is formed on the piezoelectric layer; and a fingerprint contact layer which is formed to cover a portion of an upper surface of the insulating layer on which the lower electrode has not been formed, the lower electrode, the piezoelectric region, and the upper electrode.

12 Claims, 9 Drawing Sheets

FINGERPRINT SENSOR AND FABRICATION METHOD THEREOF

BACKGROUND OF THE INVENTION

This application claims the priority of Korean Patent Application No. 2003-81724, filed on Nov. 18, 2003, in the Korean Intellectual Property Office, the disclosure of which is incorporated herein in its entirety by reference.

1. Field of the Invention

The present invention relates to a fingerprint sensor and a fabrication method thereof, and more particularly, to a fingerprint sensor adopting a complementary metal-oxide semiconductor (CMOS) structure on which a piezoelectric region for generating ultrasonic waves is formed, so as to be fabricated using a simple process and to authenticate a fingerprint at a high speed.

2. Description of the Related Art

In the past, goods were purchased through off-line direct trades by cash payments. However, economic and social advances have changed this way of trade into today's transactions by credit cards, off-line e-money, or the like. This gives rise to a social problem of security management of personal information. Thus, a process of inputting identifications (IDs) and passwords is not sufficient to secure personal information.

Accordingly, personal information must be reliably secured. Also, in order to provide portable or personal information at any place, a specific signal must be sensed and deciphered to establish a user's identity in-situ. A security system generally adopts a personal authentication method using biometric technology, i.e., fingerprint sensing technology. A fingerprint sensing system includes a fingerprint scanner, i.e., a fingerprint sensor, and a signal processing algorithm. The fingerprint sensing system must have a high sensing rate and a low error rate to obtain a high-quality image of a fingerprint. A high-performance fingerprint sensor is necessary for this high-quality image of the fingerprint.

A fingerprint sensor is generally classified as an optical type sensor, a capacitive type sensor, an ultrasonic type sensor, and the like. The optical type of fingerprint sensor is convenient to use but is relatively high-priced, sensitive to the dry or moist state of the fingerprint part of a finger to cause inexact fingerprint sensing, and may sense a false fingerprint as a true fingerprint. The capacitive type fingerprint sensor is lower priced than the optical type fingerprint sensor, compact, and highly stable but sensitive to the dry or moist state of the fingerprint part of the finger. In contrast, the ultrasonic type fingerprint sensor can obtain reliable sensing results regardless of the state of the fingerprint part of the finger.

An ultrasonic type fingerprint sensing system generally follows a fingerprint authentication process shown in FIG. 1A. First, the ultrasonic type fingerprint sensing system senses a fingerprint using a fingerprint sensor, extracts a characteristic portion from the sensed fingerprint, and stores the characteristic portion in a database (DB) to be used to distinguish the fingerprint from different types of fingerprints. Thereafter, the ultrasonic type fingerprint sensing system compares a characteristic portion of a fingerprint obtained during fingerprint authentication with the characteristic portion of the fingerprint stored in the DB to authenticate the obtained fingerprint.

FIG. 1B is a cross-sectional view of an ultrasonic type fingerprint sensor disclosed in U.S. Pat. No. 5,587,533. In the ultrasonic type fingerprint sensor of FIG. 1B, an ultrasonic transducer 140, a mirror 156, a motor 160, an actuator 154, and a signal processor (not shown) are separately fabricated and then put together. Thus, the ultrasonic type fingerprint sensor adopts a separately fabricated probe 102, which scans a fingerprint, and thus is costly and not easily applied to portable terminals. Also, the ultrasonic type fingerprint sensor obtains an image of a fingerprint using a scan method, resulting in slow fingerprint authentication.

SUMMARY OF THE INVENTION

The present invention provides a fingerprint sensor of an ultrasonic type in which components can be fabricated together using a micro-electric mechanical system (MEMS) process to have a thin film shape so as to increase a fingerprint authentication speed, and a fabrication method thereof.

According to an aspect of the present invention, there is provided a fingerprint sensor using ultrasonic waves. The fingerprint sensor includes: a complementary metal-oxide semiconductor structure which is formed on a substrate that is doped with a first type dopant; an insulating layer which is formed on the complementary metal-oxide semiconductor structure; a lower electrode which is formed in a central portion of the insulating layer; a piezoelectric region which is formed on the lower electrode; an upper electrode which is formed on the piezoelectric layer; and a fingerprint contact layer which is formed to cover a portion of an upper surface of the insulating layer on which the lower electrode has not been formed, the lower electrode, the piezoelectric region, and the upper electrode.

The complementary metal-oxide semiconductor structure includes: a region which is formed in a portion of the surface of the substrate by doping with a second type dopant; a source and a drain which are formed in the surface of the region doped with the second type dopant by doping with the first type dopant; and a source and a drain which are formed in a portion of the surface of the substrate by doping the portion the second type dopant so as to be opposite to the source and the drain doped with the first type dopant.

The lower electrode is electrically connected to the drain doped with the first type dopant and the source doped with the second type dopant.

The lower electrode is electrically connected to the drain doped with the first type dopant and the source doped with the second type dopant through via holes which penetrate through the insulating layer and are filled with a conductive material.

The piezoelectric region includes at least one of PZT, PST, Quartz, (Pb, Sm)TiO$_3$, PMN(Pb(MgNb)O$_3$)-PT(PbTiO$_3$), PVDF, and PVDF-TrFe.

The fingerprint contact layer includes a material having a similar acoustic impedance to that of the skin tissue of a person's finger.

The fingerprint contact layer includes at least one of polymer materials comprising polyurethane, polystyrene, and rubber.

As an aspect of the present invention, the fingerprint sensor may have a matrix structure in which unit elements are arrayed.

According to another aspect of the present invention, there is provided a method of fabricating a fingerprint sensor using ultrasonic waves, the method including: forming a complementary metal-oxide semiconductor structure on a substrate that is doped with a first type dopant; forming an insulating layer on the complementary metal-oxide semiconductor structure and sequentially forming a lower electrode, a piezoelectric region, and an upper electrode on the insulating layer; removing side portions of the lower electrode, the piezoelectric region, and the upper electrode; and forming a fingerprint contact layer to cover a portion of an upper surface of the insulating layer, the lower electrode, the piezoelectric region, and the upper electrode.

The formation of the insulating layer includes: forming the insulating layer on the complementary metal-oxide semiconductor structure; forming first and second via holes in the insulating layer to respectively face a drain of the complementary metal-oxide semiconductor structure having the first polarity and a source of the complementary metal-oxide semiconductor structure having a second polarity and then filling the first and second via holes with a conductive material; and sequentially forming the lower electrode, the piezoelectric region, and the upper electrode on the insulating layer and the first and second via holes.

The piezoelectric region includes at least one of PZT, PST, Quartz, (Pb, Sm)TiO$_3$, PMN(Pb(MgNb)O$_3$)-PT(PbTiO$_3$), PVDF, and PVDF-TrFe.

The fingerprint contact layer includes at least one of polymer materials including polyurethane, polystyrene, and rubber that have a similar acoustic impedance to that of the skin tissue of a person's finger.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a fingerprint sensor according to an embodiment of the present invention will be described in detail with reference to the attached drawing.

Figure 2:
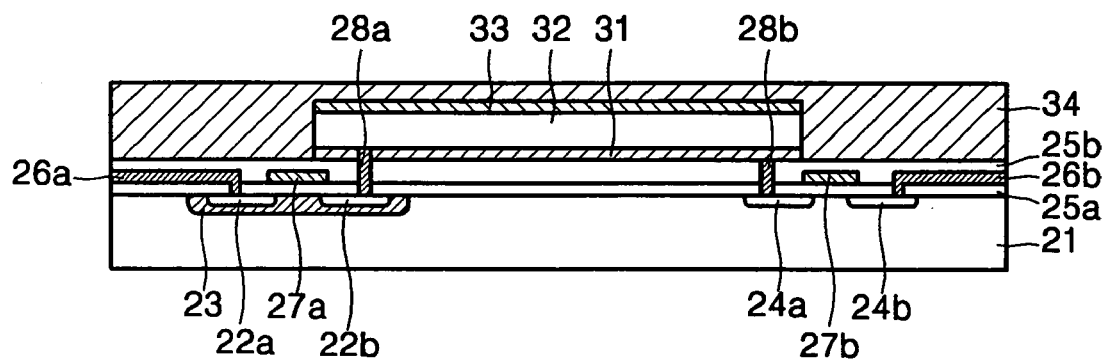
FIG. 2 is a cross-sectional view of a fingerprint sensor according to an embodiment of the present invention.

FIG. 2 is a cross-sectional view of a fingerprint sensor according to an embodiment of the present invention. A CMOS structure in which a negative-channel metal-oxide semiconductor (NMOS) structure and a positive-channel metal-oxide semiconductor (PMOS) structure are formed on an n-type or p-type substrate is formed as a lower structure of the fingerprint sensor according to the present invention. This will be briefly explained as follows. Here, a case where an n-type substrate is used will be explained. A portion of the surface of an n-type substrate 21 is doped with a p-type dopant to form a p-type doped layer 23. An n-type source 22a and an n-type drain 22b are formed in the portion of the surface of the n-type substrate 21 in which the p-type doped layer 23 has been formed. A p-type source 24a and a p-type drain 24b are formed in a portion of the surface of the n-type substrate 21 opposite to the n-type source 22a and the n-type drain 22b. A thin first insulating layer 25a is formed on the n-type substrate 21.

A first gate 27a is formed on the first insulating layer 25a to face the n-type source 22a and the n-type drain 22b. A second gate 27b is formed on the first insulating layer 25a to face the p-type source 24a and the p-type drain 24b. A first electrode 26a is formed on the first insulating layer 25a to be electrically connected to the n-type source 22a. For the electrical connection of the first electrode 26a with the n-type source 22a, a portion of the first insulating layer 25a beneath which the n-type source 22a has been formed is removed. A second electrode 26b is formed on the first insulating layer 25a to be electrically connected to the p-type drain 24b. For the electrical connection of the second electrode 26b with the p-type drain 24b, a portion of the first insulating layer 25a beneath which the p-type drain 24b has been formed is removed.

A second insulating layer 25b is formed on the above-described CMOS structure, i.e., on the first insulating layer 25a, the first and second gates 27a and 27b, and the first and second electrodes 26a and 26b. First and second via holes 28a and 28b are formed to penetrate through portions of the first and second insulating layers 25a and 25b, underneath which the n-type drain 22b and the p-type source 24a have been formed. The first and second via holes 28a and 28b are filled with a conductive material.

The resultant structure refers to the lower structure of the fingerprint sensor according to the present invention. In other words, the lower structure of the fingerprint sensor according to the present invention has a structure in which the first and second via holes 28a and 28b are formed to penetrate through the portions of the first and second insulating layers 25a and 25b, underneath which the n-type drain 22b and the p-type source 24a of the CMOS structure are formed, and then filled with the conductive material.

An upper structure of the fingerprint sensor according to the present invention will now be explained. A lower electrode 31 is formed on the central portion of the second insulating layer 25b but not the side portions of the second insulating layer 25b and is electrically connected to the conductive material of the first via holes 28a and 28b. A piezoelectric region 32 is formed on the lower electrode 31, and then an upper electrode 33 is formed on the piezoelectric region 32. A fingerprint contact layer 34 is formed to cover a portion of the upper surface of the second insulating layer 25b, the lower electrode 31, the piezoelectric region 32, and the upper electrode 33. Here, the piezoelectric region 32 is generally formed of a piezoelectric material such as PZT or the like. The fingerprint contact layer 34 is formed so as to include a material having a similar acoustic impedance to that of the skin tissue of a person's finger. For example, the fingerprint contact layer 34 may be formed of a polymer material such as polyurethane, polystyrene, rubber, or the like.

As an aspect of the present invention, the fingerprint sensor according to the present invention includes lower and upper structures as described above. The lower and upper structures are unit elements of the fingerprint sensor. The fingerprint sensor according to the present invention may have an M×N matrix structure in which such unit elements are arrayed.

The fingerprint sensor according to the present invention has a structure in which unit elements each including the lower electrode 31, the piezoelectric region 32, and the upper electrode 33 are arrayed on the lower structure. The size of the unit elements of the fingerprint sensor according to the present invention, i.e., the width of the unit elements of the fingerprint sensor, is about 50 mm or less. In order to obtain a fingerprint image of 500 dpi or more, the resonant frequency in the unit elements of the fingerprint sensor must be 30 MHZ or more. Thus, the size of the unit elements must be 50 mm or less.

The operation of the fingerprint sensor according to the present invention will be described in more detail with reference to FIGS. 3A through 3E.

Figure 3A:
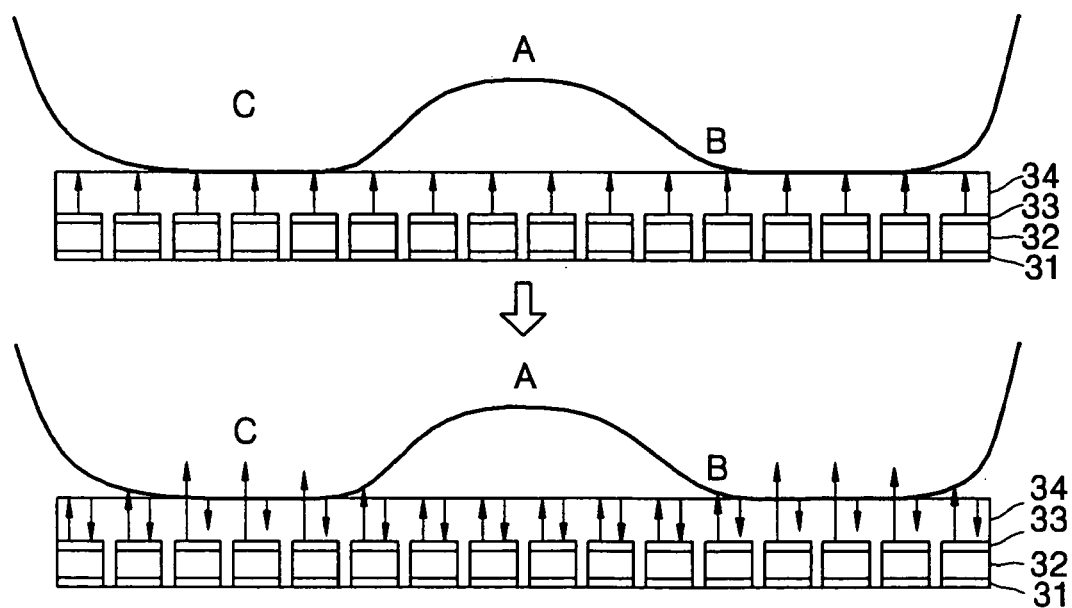
FIGS. 3A through 3E are schematic views and a circuit diagram explaining the operation of the fingerprint sensor according to the present invention.

FIG. 3A is a cross-sectional view showing the fingerprint part of the end of a finger contacting the surface of the fingerprint sensor according to the present invention. The piezoelectric region 32 generates ultrasonic waves due to power applied by the lower and upper electrodes 31 and 33.

Vertically advancing ultrasonic waves "↕" of the ultrasonic waves generated by the piezoelectric region 32 are used in a fingerprint authentication process according to the present invention. When the fingerprint part of a person's finger does not contact the fingerprint contact layer 34, the ultrasonic waves are mostly reflected from the surface of the fingerprint contact layer 34. The reflection of the ultrasonic waves is because of a great difference between acoustic impedances of the surface of the fingerprint contact layer 34 and air.

Figure 3B:
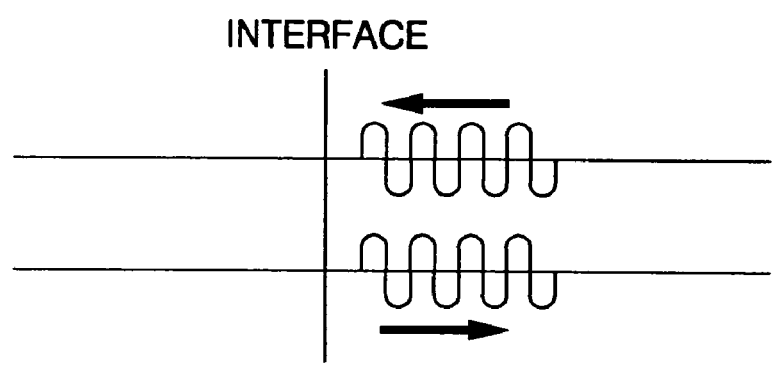
Figure 3C:
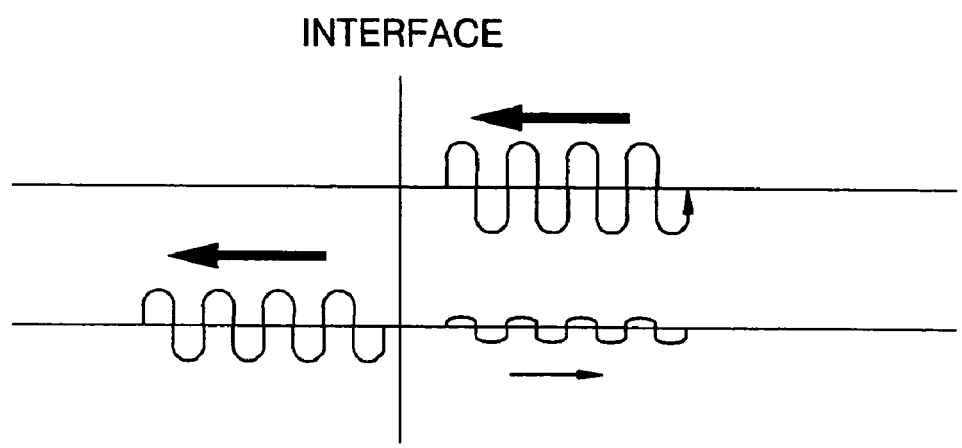
Figure 3D:
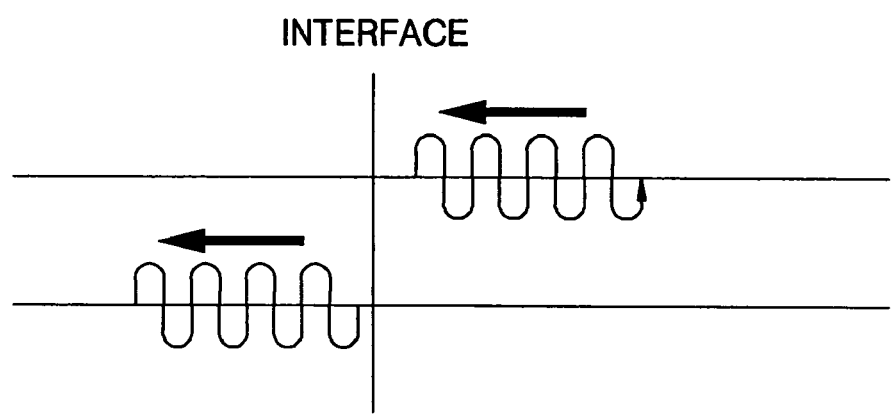

When the fingerprint part of a person's finger contacts the fingerprint contact layer 34, the ultrasonic waves advance as shown in FIG. 3A. Referring to FIG. 3A, reference character A denotes a portion of the fingerprint part of a person's finger which does not contact the surface of the fingerprint contact layer 34 that faces a unit element in the fingerprint sensor according to the present invention. In other words, reference character A denotes a valley between ridges of the fingerprint part of the person's finger. As shown in FIGS. 3A and 3B, the ultrasonic waves generated by the piezoelectric region 32 are mostly reflected from the surface of the fingerprint contact layer 34 and then return to the inside of the fingerprint sensor according to the present invention. Reference character B denotes a portion of the fingerprint part of the person's finger contacting the surface of a unit element of the fingerprint sensor according to the present invention. In this case, ridges of the fingerprint part of the person's finger have a similar acoustic impedance to that of the fingerprint contact layer 34 and thus pass some of the ultrasonic waves therethrough. However, since a portion of the finger contact layer 34 does not contact the ridges of the fingerprint part of the person's finger, some of the ultrasonic waves are reflected from the portion of the fingerprint contact layer 34. This is shown in FIG. 3C. When the entire surface of the fingerprint contact layer 34 of a unit element of the fingerprint sensor according to the present invention contacts the ridges of the fingerprint part of a person's finger, the ultrasonic waves are mostly absorbed into the skin tissue of the person's finger. Thus, the ultrasonic waves are hardly reflected. Reference character C of FIG. 3A denotes a ridge of the fingerprint part of a person's finger where ultrasonic waves are absorbed. FIG. 3D shows ultrasonic waves that are not reflected from but pass through the surface of the fingerprint contact layer 34.

Figure 1A:
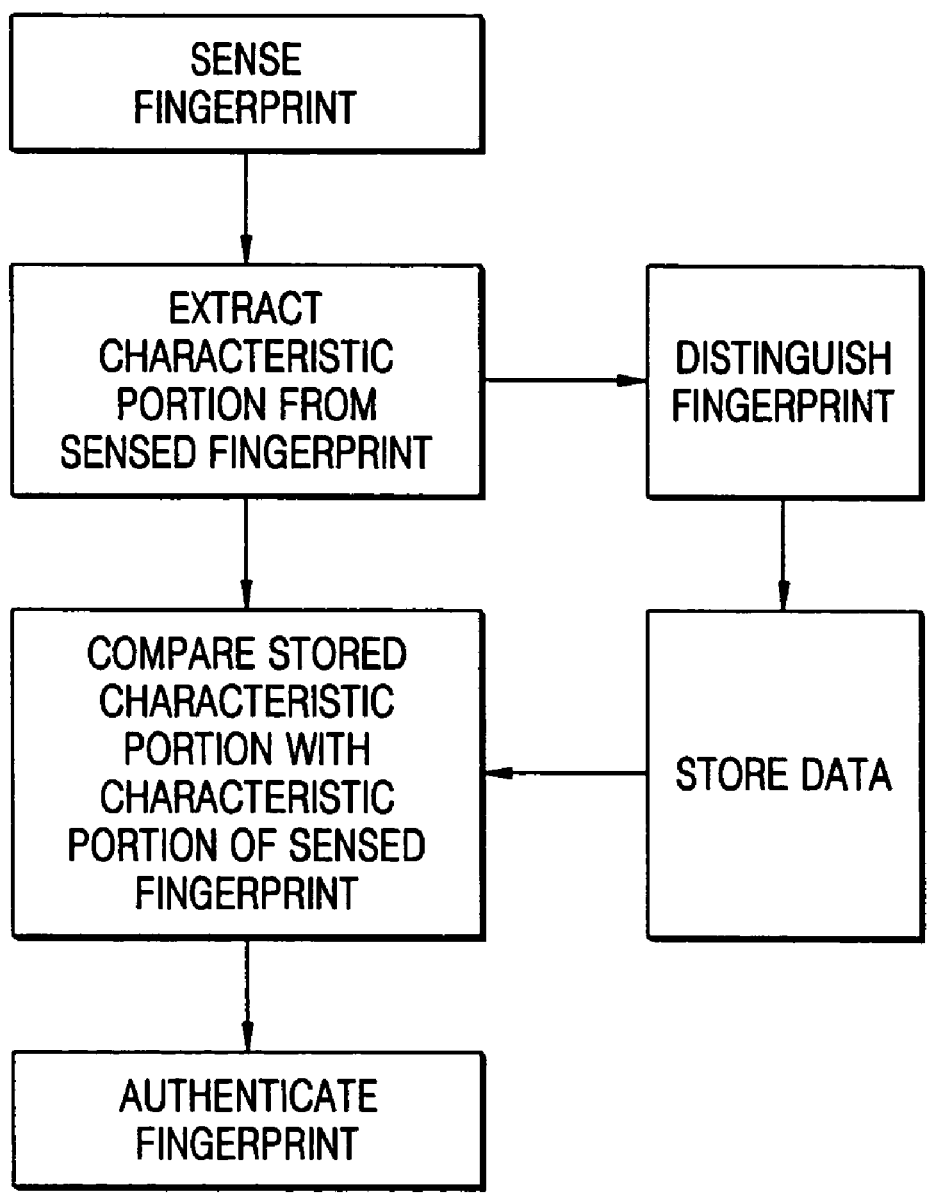
FIG. 1A is a flowchart showing a fingerprint authentication process according to the prior art.
Figure 1B:
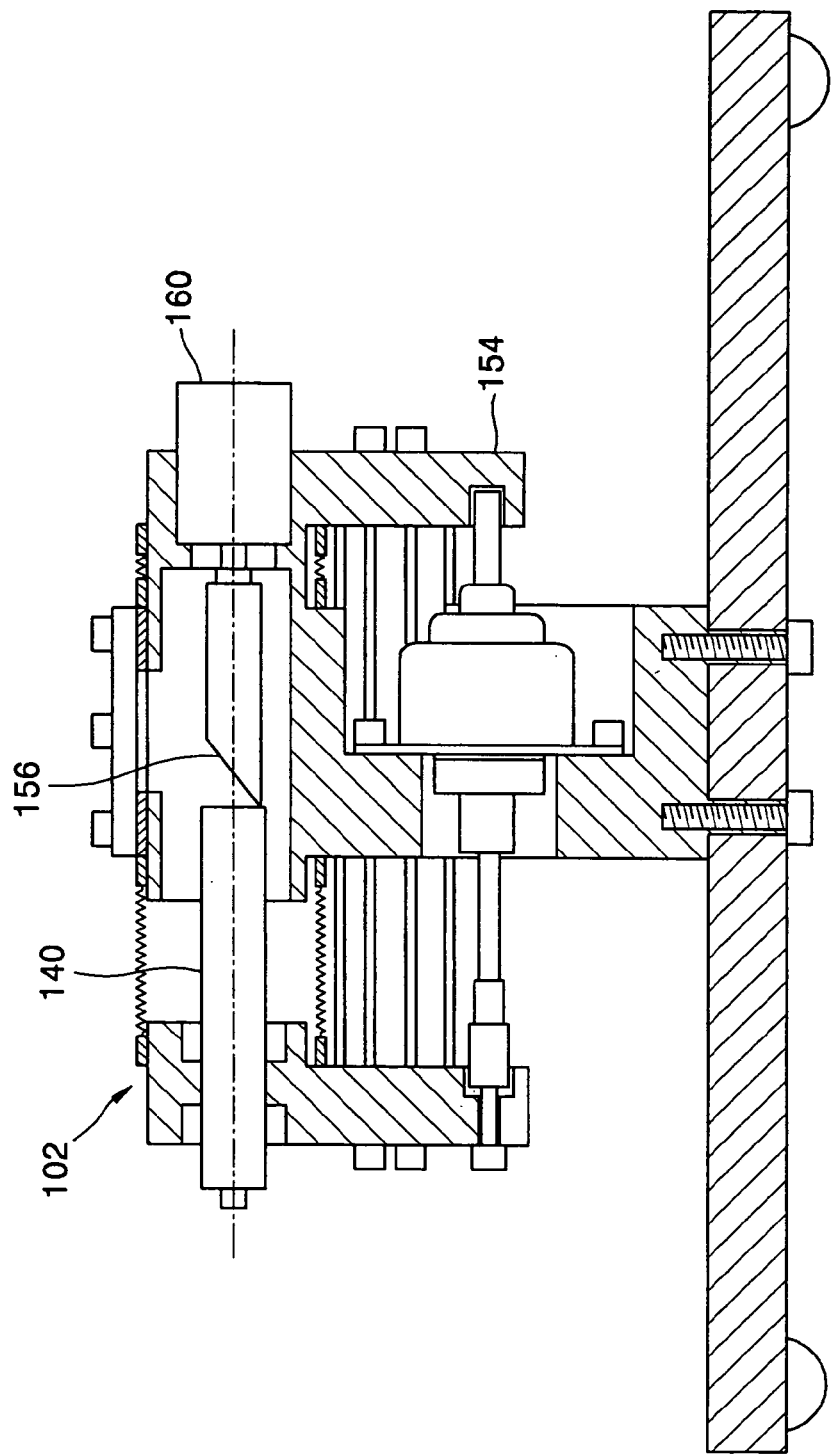
FIG. 1B is a cross-sectional view of a conventional fingerprint sensor.
Figure 3E:
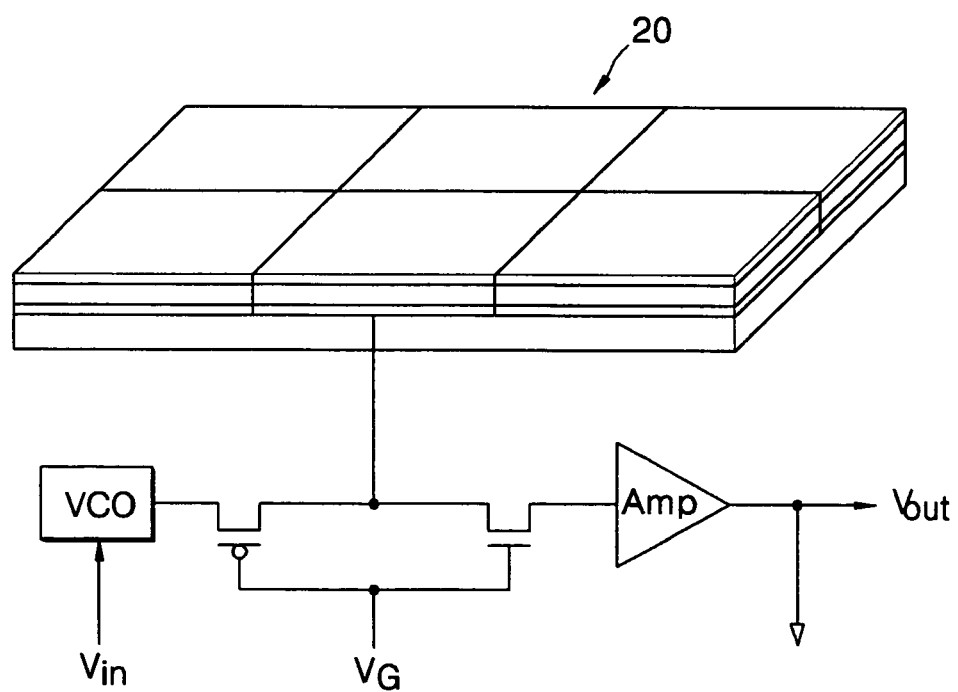

FIG. 3E is a circuit diagram showing the operation of the fingerprint sensor according to the present invention. Referring to FIG. 3E, when an electric potential is applied using a CMOS structure to generate the ultrasonic waves and an applying unit is switched off, electric potential values of reflected ultrasonic waves are measured. Thus, the fingerprint sensor, which contacts the fingerprint part of a person's finger, receives a signal generated from the reflected ultrasonic waves and transmits the signal to a controller (not shown). Accordingly, a signal generated from each unit element of the fingerprint sensor having the array structure is analyzed and location values of portions of the fingerprint sensor contacting the ridges of the fingerprint part of a person's finger are calculated to detect a fingerprint. The detected fingerprint undergoes the fingerprint authentication process of FIG. 1A.

An embodiment of a method of fabricating the fingerprint sensor according to the present invention will now be explained with reference to FIGS. 4A through 4G.

FIGS. 4A through 4G are cross-sectional views explaining a method of fabricating a fingerprint sensor according to an embodiment of the present invention.

Figure 4A:
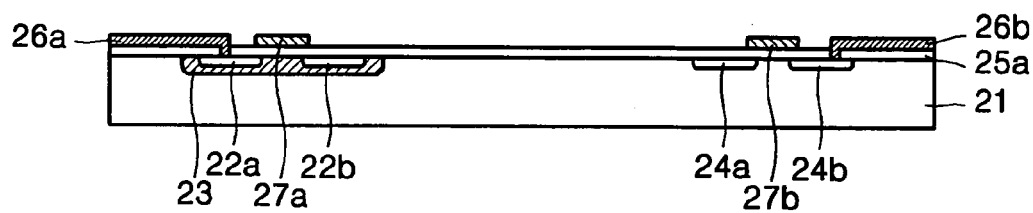
FIGS. 4A through 4G are cross-sectional views explaining a method of fabricating a fingerprint sensor according to an embodiment of the present invention.

FIG. 4A shows a general CMOS structure. Such a CMOS structure may be fabricated using a conventional method which will not be described here. A substrate 21 is doped with a dopant. In other words, an n-type or p-type substrate may be formed by doping it with an n-type or p-type dopant. In the present invention, the substrate 21 is n-type.

The CMOS structure will be explained with reference to FIG. 4A. A portion of the surface of the n-type substrate 21 is doped with a material having an opposite polarity to the n-type substrate 21, i.e., a second polarity. In other words, the portion of the surface of the n-type substrate 21 is doped with a p-type dopant to form a p-type doped layer 23. An n-type source 22a and an n-type drain 22b are formed in the surface of the n-type substrate 21 in which the p-type doped layer 23 has been formed. A p-type source 24a and a p-type drain 24b are formed in a portion of the surface of the n-type substrate 21 opposite to the n-type source 22a and the n-type drain 22b. A thin first insulating layer 25a is formed on the n-type substrate 21.

A first gate 27a is formed on the first insulating layer 25a to face the n-type source 22a and the n-type drain 22b. A second gate 27b is formed on the first insulating layer 25a to face the p-type source 24a and the p-type drain 24b. A first electrode 26a is formed on the first insulating layer 25a to be electrically connected to the n-type source 22a. For the electrical connection of the first electrode 26a with the n-type source 22a, a portion of the first insulating layer 25a beneath which the n-type source 22a has been formed is removed. A second electrode 26b is formed on the first insulating layer 25a to be electrically connected to the p-type drain 24b. For the electrical connection of the second electrode 26b with the p-type drain 24b, a portion of the first insulating layer 25a beneath which the p-type drain 24b has been formed is removed.

Figure 4B:
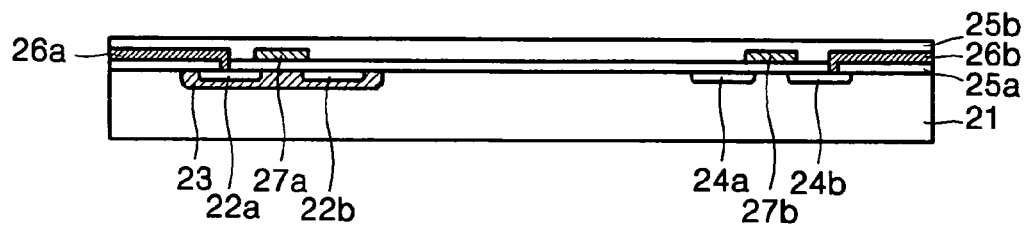

As shown in FIG. 4B, a second insulating layer 25b is formed on the first insulating layer 25a to a thickness of 0.01-1 μm and serves as a passivation layer. The second insulating layer 25b is formed of a silicon oxide film using plasma enhanced chemical vapor deposition (PECVD). As a result, the second insulating layer 25b covers the first and second electrodes 26a and 26b, the first and second gates 27a and 27b, and the first insulating layer 25a.

Figure 4C:
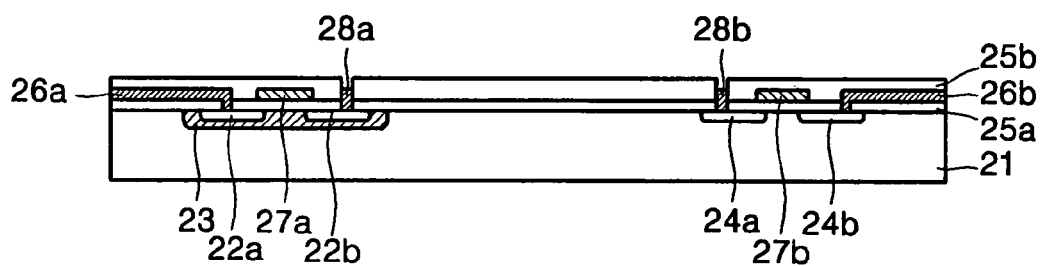
Figure 4D:
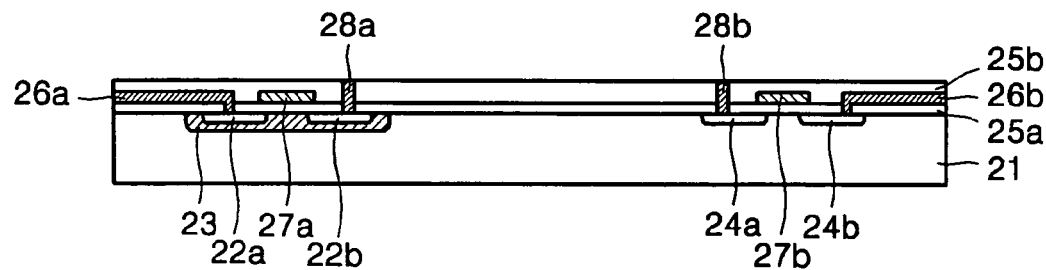

As shown in FIG. 4C, portions of the second insulating layer 25b are removed up to the n-type drain 22b and the p-type source 24a using wet etching or reactive ion etching. The removal of the portions of the second insulating layer 25b results in forming first and second via holes 28a and 28b. As shown in FIG. 4D, the first and second via holes 28a and 28b are filled with a conductive material, for example, a metal such as tungsten or the like, using CVD or sputtering. As a result, a lower structure of a fingerprint sensor according to the present invention as described with reference to FIG. 2 is completed.

Figure 4E:
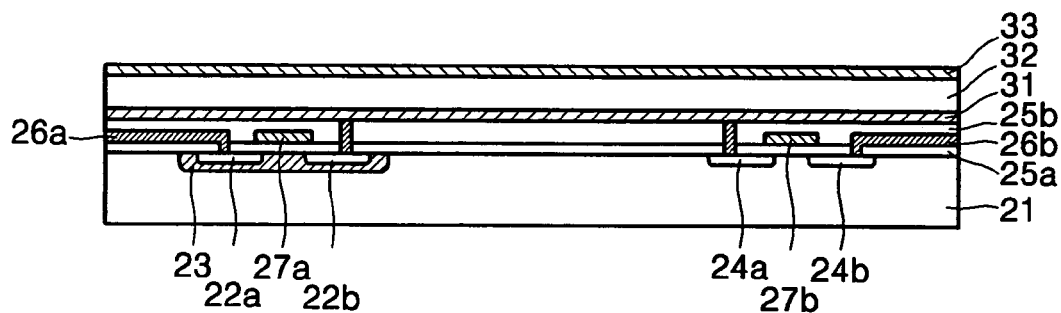

An upper structure of the fingerprint sensor according to the present invention will be formed as follows. As shown in FIG. 4E, a lower electrode 31 is formed of a metal such as Pt, Ti, Pd, Al, or Cu on the second insulating layer 25b, using sputtering or CVD, to a thickness of about 0.01-1 μm. The lower electrode 31 is covered with a piezoelectric material such as PZT, using a Sol-Gel process or sputtering, to form a piezoelectric region 32 having a thickness of about 0.5-20 μm. An upper electrode 33 is formed of a material such as Pt, Ti, Pd, Al, or Cu on the piezoelectric region 32, using sputtering or CVD, to have a thickness of about 0.01-1 μm.

Figure 4F:
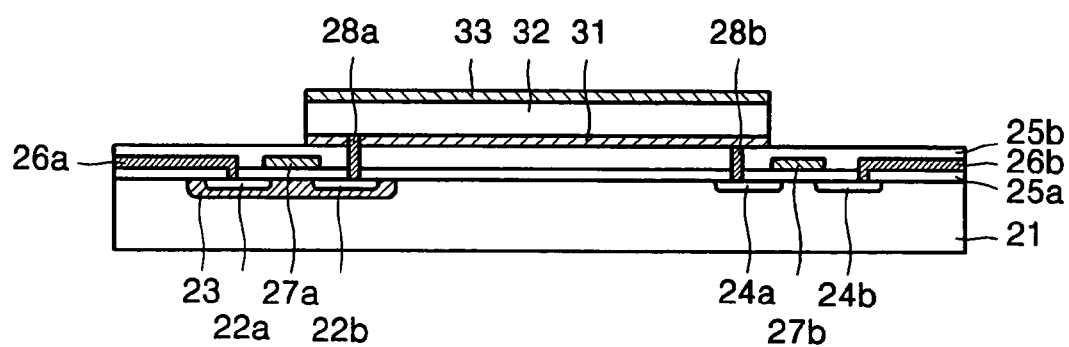

As shown in FIG. 4F, side portions of the lower electrode 31, the piezoelectric region 32, and the upper electrode 33 are removed using lithography or etching, i.e., wet etching or reactive ion etching. Here, the lower electrode 31 is connected to the conductive material which has filled the first and second via holes 28a and 28b. When a fingerprint sensor having an array structure is fabricated, the piezoelectric region 32 is formed in a square shape to a width and length of about 50 mm. In other words, lithography or etching makes the piezoelectric region 32 a predetermined size and the upper electrode 33 stripe-shaped so as to be connected to upper electrodes of other elements of the fingerprint sensor.

The piezoelectric region 32 may be formed of a general piezoelectric material or an oxide-family or polymer-family piezoelectric material. Such a piezoelectric material may be PZT, PST, Quartz, (Pb, Sm)TiO$_3$, PMN(Pb(MgNb)O$_3$)-PT (PbTiO$_3$), PVDF, or PVDF-TrFe.

Figure 4G:
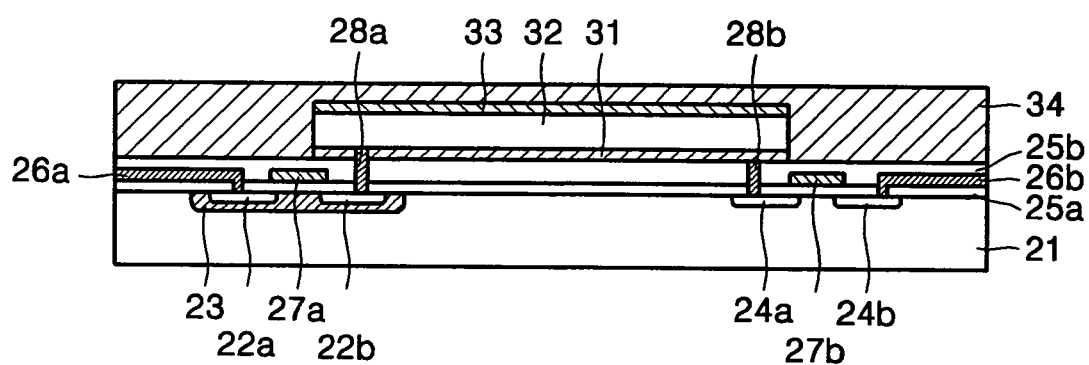

As shown in FIG. 4G, a fingerprint contact layer 34 is formed to a thickness of about 10 μm or more using spin-coating or an e-beam to cover a portion of the upper surface of the second insulating layer 25b, the lower electrode 31, the piezoelectric region 32, and the upper electrode 33. The fingerprint contact layer 34 guides the path of ultrasonic waves generated by the piezoelectric region 32 and is formed of a material having a similar acoustic impedance to that of the skin tissue of a person's finger. For example, the fingerprint contact layer 34 may be formed of a polymer material such as polyurethane, polystyrene, rubber, or the like. Accordingly, unit elements of the fingerprint sensor according to the present invention or an array type fingerprint sensor having an M×N matrix structure is completely fabricated.

As described above, in a fingerprint sensor of an ultrasonic type and a fabrication method thereof according to the present invention, a CMOS structure can be adopted to process a signal. Also, a piezoelectric region can be formed over the CMOS structure to generate ultrasonic waves. As a result, the fingerprint sensor can be simply fabricated. Moreover, the fingerprint sensor can sense and authenticate a fingerprint at a high speed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A fingerprint sensor using ultrasonic waves, comprising:
   a complementary metal-oxide semiconductor structure which is formed on a substrate that is doped with a first type dopant;
   an insulating layer which is formed on the complementary metal-oxide semiconductor structure;
   a lower electrode which is formed in a central portion of the insulating layer;
   a piezoelectric region which is formed on the lower electrode;
   an upper electrode which is formed on the piezoelectric layer; and
   a fingerprint contact layer which is formed to cover a portion of an upper surface of the insulating layer on which the lower electrode has not been formed, the lower electrode, the piezoelectric region, and the upper electrode.

2. The fingerprint sensor of claim 1, wherein the complementary metal-oxide semiconductor structure comprises:
   a region which is formed in a portion of the surface of the substrate by doping with a second type dopant;
   a source and a drain which are formed in the surface of the region doped with the second type dopant by doping with the first type dopant; and
   a source and a drain which are formed in a portion of the surface of the substrate by doping the portion the second type dopant so as to be opposite to the source and the drain doped with the first type dopant.

3. The fingerprint sensor of claim 2, wherein the lower electrode is electrically connected to the drain doped with the first type dopant and the source doped with the second type dopant.

4. The fingerprint sensor of claim 3, wherein the lower electrode is electrically connected to the drain doped with the first type dopant and the source doped with the second type dopant through via holes which penetrate through the insulating layer and are filled with a conductive material.

5. The fingerprint sensor of claim 1, wherein the piezoelectric region comprises at least one of PZT, PST, Quartz, (Pb, Sm)TiO$_3$, PMN(Pb(MgNb)O$_3$)-PT(PbTiO$_3$), PVDF, and PVDF-TrFe.

6. The fingerprint sensor of claim 1, wherein the fingerprint contact layer comprises a material having a similar acoustic impedance to that of the skin tissue of a person's finger.

7. The fingerprint sensor of claim 6, wherein the fingerprint contact layer comprises at least one of polymer materials comprising polyurethane, polystyrene, and rubber.

8. The fingerprint sensor of claim 1, wherein the fingerprint sensor has a matrix structure in which unit elements are arrayed.

9. A method of fabricating a fingerprint sensor using ultrasonic waves, comprising:
   forming a complementary metal-oxide semiconductor structure on a substrate that is doped with a first type dopant;
   forming an insulating layer on the complementary metal-oxide semiconductor structure and sequentially forming a lower electrode, a piezoelectric region, and an upper electrode on the insulating layer;
   removing side portions of the lower electrode, the piezoelectric region, and the upper electrode; and
   forming a fingerprint contact layer to cover a portion of an upper surface of the insulating layer, the lower electrode, the piezoelectric region, and the upper electrode.

10. The method of claim 9, wherein the formation of the insulating layer comprises:
    forming the insulating layer on the complementary metal-oxide semiconductor structure;
    forming first and second via holes in the insulating layer to respectively face a drain of the complementary metal-oxide semiconductor structure having the first polarity and a source of the complementary metal-oxide semiconductor structure having a second polarity and then filling the first and second via holes with a conductive material; and
    sequentially forming the lower electrode, the piezoelectric region, and the upper electrode on the insulating layer and the first and second via holes.

11. The method of claim 9, wherein the piezoelectric region comprises at least one of PZT, PST, Quartz, (Pb, Sm)TiO$_3$, PMN(Pb(MgNb)O$_3$)-PT(PbTiO$_3$), PVDF, and PVDF-TrFe.

12. The method of claim 9, wherein the fingerprint contact layer comprises at least one of polymer materials comprising polyurethane, polystyrene, and rubber that have a similar acoustic impedance to that of the skin tissue of a person's finger.

* * * * *